(12) United States Patent
Belyanin et al.

(10) Patent No.: US 6,940,639 B1
(45) Date of Patent: Sep. 6, 2005

(54) PHASE MATCHED PARAMETRIC LIGHT GENERATION IN MONOLITHICALLY INTEGRATED INTERSUBBAND OPTICAL DEVICES

(75) Inventors: Alexey Belyanin, College Station, TX (US); Alfred Yi Cho, Summit, NJ (US); Claire F. Gmachl, Princeton, NJ (US); Oana Malis, Chatham, NJ (US); Milton L. Peabody, Jr., Somerville, NJ (US); Arthur Mike Sergent, New Providence, NJ (US); Deborah Lee Sivco, Warren, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 10/812,328

(22) Filed: Mar. 29, 2004

(51) Int. Cl.[7] .............. G02F 1/39; G02B 6/10; H01S 5/34
(52) U.S. Cl. .......... 359/330; 372/44; 385/122; 385/131
(58) Field of Search ............ 359/326–332; 372/21–22, 372/43–50; 385/122, 129–132

(56) References Cited

U.S. PATENT DOCUMENTS

| | | | |
|---|---|---|---|
| 5,898,720 A | 4/1999 | Yamamoto et al. | ............ 372/39 |
| 6,795,467 B2 * | 9/2004 | Capasso et al. | ............... 372/44 |

OTHER PUBLICATIONS

Meyer et al., *Appl. Phys. Lett.*, vol. 67, No. 5, pp. 608-610 (Jul. 1995).
Rosencher et al., *Science*, vol. 271, pp. 168-173 (Jan. 1996).
Gurnick et al., *IEEE J. Quantum Electron.*, vol. 19, No. 5, pp. 791-794 (May 1983).
Capasso et al., *IEEE J. Quantum Electron.*, vol. 30, No. 5, pp. 1313-1326 (May 1994).
Vurgaftman et al., *IEEE J. Quantum Electron.*, vol. 32, No. 8, pp. 1334-1346 (Aug. 1996).
Gmachl et al., *IEEE J. Quantum Electron.*, vol. 39, No. 11, pp. 1345-1355 (Nov. 2003).
Owschimikow et al., *Phys. Rev. Lett.*, vol. 90, No. 4, pp. 043902-(1-4) (Jan. 2003).
Fiore et al., *Nature.*, vol. 391, pp. 463-466 (Jan. 1998).
Vodopyanov et al., *Appl. Phys. Lett.*, vol. 72, No. 21, pp. 2654-2656 (May 1998).
Chowdhury et al., *IEEE Photon. Technol.. Lett.*, vol. 12, No. 5, pp. 486-488 (May 2000).
Moutzouris et al., *Appl. Phys. Lett.*, vol. 83, No. 4, pp. 620-622 (Jul. 2003).
Capasso et al., Copending U.S. Appl. No. 10/261,423, filed Sep. 30, 2002, entitled *Nonlinear Semiconductor Light Sources*.

* cited by examiner

*Primary Examiner*—John D. Lee (57) ABSTRACT

An optical device comprises a cavity resonator and an intracavity ridge waveguide. The ridge waveguide includes a monolithically integrated intersubband core region and a nonlinear mixing region (NMR). In response to external pumping energy the core region generates laser light at a first frequency and in a first transverse mode. In response to the laser light the NMR generates parametric light at a second frequency and in a second transverse mode. For phase matching the effective-refractive-index-versus-ridge-width characteristics of the modes of the laser and the parametric light intersect one another at a phase matching width and so that, at greater widths, the effective refractive index of the mode of the higher frequency light is less than that of the lower frequency light. For true phase matching the width of the ridge is made to be essentially equal to the phase matching width.

16 Claims, 3 Drawing Sheets

PHASE MATCHED PARAMETRIC LIGHT GENERATION IN MONOLITHICALLY INTEGRATED INTERSUBBAND OPTICAL DEVICES

GOVERNMENT CONTRACT

This invention was made with Government support under Contract No. DAAD19-00-C-0096 by the DARPA/US Army Research Office. The Government has certain rights in this invention.

BACKGROUND OF THE INVENTION

1. Field of the Invention

This invention relates to true phase matched parametric generation of light in monolithically integrated intersubband (ISB) semiconductor optical devices in general and, more particularly, to true phase matched second harmonic (SH) generation of light in monolithically integrated quantum cascade (QC) semiconductor optical devices.

2. Discussion of the Related Art

By the phrase parametric generation we mean any optical process by which light of one center frequency is made incident on or is generated inside a nonlinear optical region (e.g., a suitably designed quantum well structure; a bulk Group III-V compound semiconductor; $LiNbO_3$) to generate light of a different center frequency and often at harmonics thereof. As such, parametric generation includes two-wave interactions such as second harmonic (SH) generation and three-wave interactions such as sum and difference frequency generation, as well as interactions involving more than three waves (e.g., four-wave mixing).

In the prior art realm of non-integrated nonlinear optical devices, it is known to utilize discrete optical pump sources and discrete nonlinear bodies to generate light at a frequency different from that of the pump source. Thus, for example, in *IEEE Photonics Technology Lett.*, Vol. 12, No. 5, pp. 486–488 (2000) Chowdhury et al. analyze continuously phase matched M-waveguides in $LiNbO_3$ for second-order nonlinear up-conversion. Implicit in the analysis is that the pump source is external to and not integrated with the $LiNbO_3$ waveguide. Similarly, in *Appl. Phys. Lett.*, Vol. 83, No. 4, pp. 620–622 (2003) Moutzouris et al. describe SH generation through optimized modal phase matching in GaAs/AlGaAs waveguides. Explicit in the experimental work is the use of a 1.55 μm optical pump source external to and not integrated with the semiconductor waveguide. Inherently, however, these types of discrete parametric devices suffer from relatively low nonlinear conversion efficiency as well as optical coupling losses between the source and nonlinear body.

In contrast, bodies of nonlinear optical semiconductor materials show promise for achieving high-efficiency, nonlinear conversion of light when monolithically integrated within compact, injection-pumped semiconductor light emitters. These integrated optical devices would extend the spectral range accessible to semiconductor optical sources and could find applications in fields ranging from high-resolution chemical sensing to quantum cryptography.

Although resonant ISB transitions have been studied extensively as a source of nonlinear (or parametric) light generation, so far practical applications have been limited by two obstacles: the lack of both a powerful integrated pump source and a tunable phase matching scheme. [See, for example, Gurnick et al., *IEEE J. Quantum Electron.*, Vol. QE-19, No. 5, pp. 791–794 (1983); Rosencher et al., *Science*, Vol. 271, pp. 168–273 (1996); Capasso et al., *IEEE J. Quantum Electron.*, Vol. 30, No. 5, pp. 1313–1326 (1994); and Vurgaftman et al., *IEEE J. Quantum Electron.*, Vol. 32, No. 8, pp. 1334–1346 (1996), all of which are incorporated herein by reference.] Only recently has the first obstacle been overcome by monolithically integrating the nonlinear ISB transitions within the structure of a QC laser. [See, for example, Owschimikow et al., *Phys. Rev. Lett.*, Vol. 90, No. 4, pp. 043902-(1–4) (2003) and Gmachl et al., *IEEE J. Quantum Electron.*, Vol. 39, No. 11, pp. 1345–1355 (2003), both of which are incorporated herein by reference.] On the other hand, the challenge of phase-matching the modes of the pump (laser) light and the modes of the parametric (e.g., SH) light continues to be an obstacle to achieving high efficiency parametric conversion.

Common techniques for phase matching, such as birefringence phase-matching or quasi phase matching, are not practical for ISB lasers. [Regarding the former, see, for example, Fiore et al., *Nature*, Vol. 391, pp. 463–466 (1998), which is incorporated herein by reference.] Moreover, the various schemes proposed for parametric (e.g., SH) phase matching in asymmetric double quantum well structures cannot be easily applied to ISB lasers because of the intrinsic waveguide dispersion, weak voltage tunability, and strict current transport requirements. [These schemes are described by Vurgaftman et al., supra, Meyer et al., *Appl. Phys. Lett.*, Vol. 67, No. 5, pp. 608–610 (1995) and Vodopyanov et al., *Appl. Phys. Lett.*, Vol. 72, No. 21, pp. 2654–2656 (1998), all of which are incorporated herein by reference.]

Thus, a need remains in the art for a monolithically integrated semiconductor optical source that exhibits true phase matching and efficient parametric light generation.

By the phrase true phase matching we mean that the nonlinear body is characterized in that the effective refractive indices of the mode of the pump light and that of the parametrically generated light are essentially equal to one another. True phase matching is to be distinguished from prior art techniques such as quasi phase matching, which relies on periodically resetting the phase of the parametric light at the layer interfaces of a multilayer nonlinear body, and birefringence phase matching, which utilizes the different indices of refraction of ordinary and extraordinary waves to make the effective refractive index of the pump light equal to that of the parametric light.

BRIEF SUMMARY OF THE INVENTION

Our technique of phase-matching takes advantage of the flexibility in the design of an integrated ISB laser waveguide, which allows for true phase matching of the internal pump and parametric modal refractive indices of different order waveguide modes, while simultaneously preserving a large overlap of the interacting modes with each other and with the nonlinear and active regions. This phase-matching technique can readily be applied to a variety of nonlinear optical processes.

In accordance with one aspect of our invention, a nonlinear optical device comprises a cavity resonator and an intracavity ridge waveguide. The ridge waveguide is a multilayered structure that includes an ISB core region and a nonlinear mixing region (NMR), which are monolithically integrated with one another. The NMR may be located adjacent the core region, but it is preferably disposed within the core region. In a further preferred embodiment the NMR is located within the active region where the light intensity is strongest. Illustratively, the quantum wells of the active region serve a dual function: to generate laser (internal pump) light and parametric light. More specifically, in response to external pumping energy (e.g., electric current) applied thereto, the active region exhibits ISB radiative transitions that generate laser light at a first frequency and in a first transverse mode. In response to the laser light the NMR generates parametric light at a second frequency different from the first frequency and in a second, different transverse mode. The parametric process may be either resonant or nonresonant. In order to phase match the laser light and the parametric light, the waveguide is configured so that the effective-refractive-index-versus-ridge-width characteristics of the modes of the laser light and the parametric light intersect one another at a phase matching width and so that, at widths greater than the phase matching width, the effective refractive index of the mode of the higher frequency light is less than that of the lower frequency light. In order to attain true phase matching the device is designed so that the width of the ridge is made to be essentially equal to the phase matching width.

BRIEF DESCRIPTION OF THE SEVERAL VIEWS OF THE DRAWING

Our invention, together with its various features and advantages, can be readily understood from the following more detailed description taken in conjunction with the accompanying drawing, in which.

In the interests of clarity and simplicity, FIGS. 1–6 have not been drawn to scale.

DETAILED DESCRIPTION OF THE INVENTION

General Structure

Figure 1:
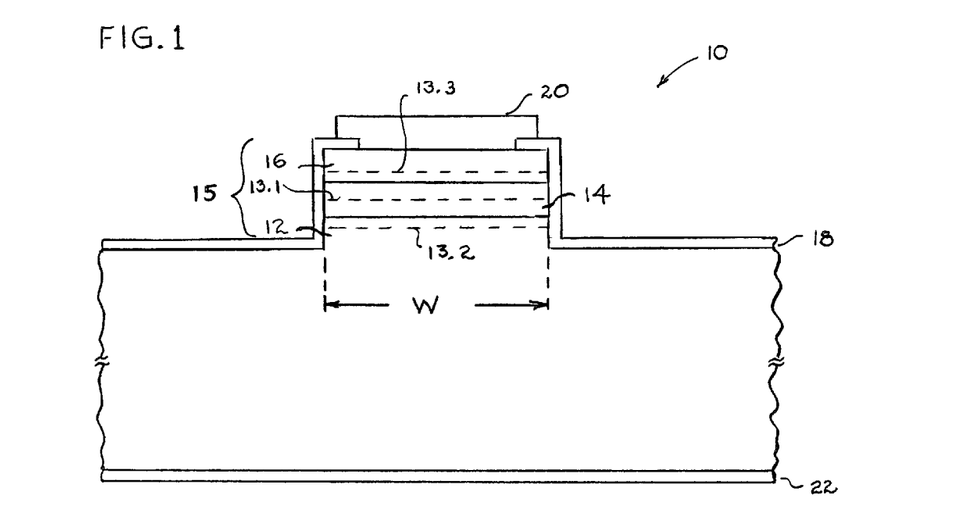
FIG. 1 is a schematic, end view of a nonlinear ISB optical device in accordance with one embodiment of our invention.
Figure 2:
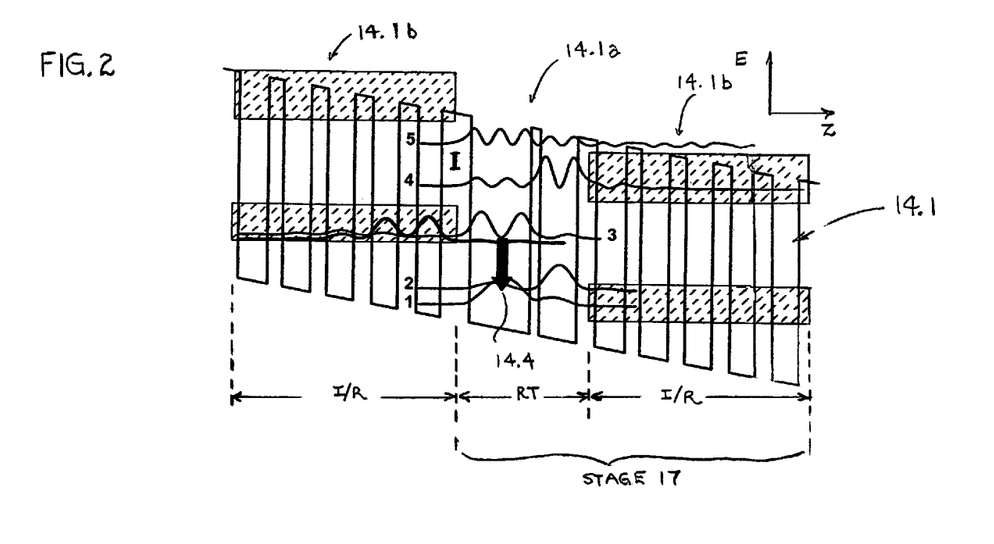
FIG. 2 is a conduction band diagram of a radiative transition (RT) region interposed between two adjacent injection/relaxation (I/R) regions, showing the moduli squared of the essential wavefunctions in accordance with one embodiment of our invention for SH generation.
Figure 3:
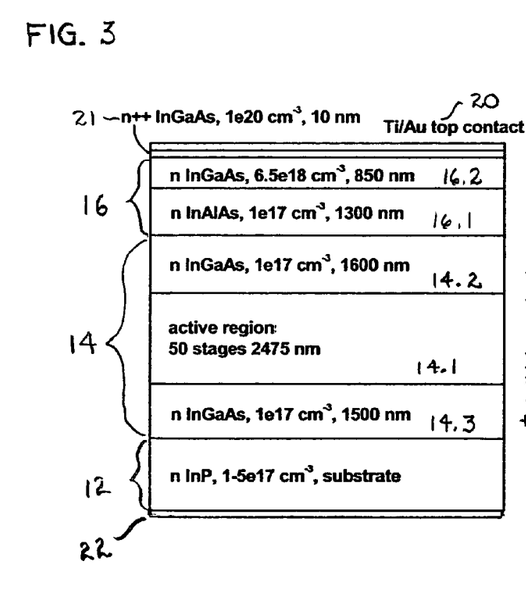
FIG. 3 is a schematic, cross-sectional view of the ridge waveguide structure of sample D2957 in accordance with one embodiment of our invention for true phase matched SH generation.

In accordance with one aspect of our invention, we show in FIGS. 1–3 a nonlinear optical device 10 that monolithically integrates an ISB (e.g., QC) laser and a nonlinear mixing region (NMR). The device 10 comprises a waveguide 15 that includes a core region 14 sandwiched between an upper cladding region 16 and a lower cladding region 12. The core region 14 includes the active region 14.1 of the laser, which serves as an internal optical pump. The active region 14.1, in turn, includes a multiplicity of essentially identical repeat units or stages; that is, the overall device is termed homogeneous. In a typical design shown in FIG. 2, each stage 17 includes a radiative transition (RT) region 14.1a and an adjacent injection/relaxation (I/R) region 14.1b. In this design each RT region 14.1a of the laser emits light (or radiation) at essentially the same center frequency (or wavelength). Alternatively, the active region may be heterogeneous; that is, not all of the stages are identical to one another. In this design, since not all of the RT regions emit light at the same center frequency, the laser emits light at multiple center frequencies. This mode of operation may be utilized in parametric processes that involve more than two-wave interactions (e.g., sum and/or difference frequency generation; four-wave mixing).

The term ISB in general refers to the well-known unipolar nature of the optical and electronic transitions that take place in the RT and I/R regions.

The NMR may be located anywhere within the waveguide 15; for example, NMR 13.1 may be located in the core region 14, or NMR 13.2 may be located in the lower cladding region 12, or NMR 13.3 may be located in the upper cladding region 16. In addition, these NMRs may be employed singly or in any combination thereof. Preferably, however, at least one NMR is located in the active region 14.1 where the light intensity is strongest. In this case, the quantum wells (QWs) of the active region serve a dual function: to generate laser light and parametric light.

As is well known in the art, the nonlinear properties of such an NMR are determined by its electronic structure; that is, by the energies of its electronic levels (e.g., the energies of the states within its QWs), the carrier (e.g., electron) population of those levels, and the dipole matrix elements corresponding to the various optical transitions associated with generating the parametric light. In general, in a resonant parametric process, the NMR comprises a multiplicity of repeat units akin to those of the active region 14.1. Indeed, in our preferred embodiment the repeat units of the NMR and the active region are identical to one another. In this case, the RT regions 14.1 include, in addition to the quantum levels that participate in generating laser light, a set of nonlinear cascades—energy levels that generate the parametric light and the laser light in a resonant process.

In general, we define a nonlinear optical process as being resonant if (1) the process includes N(N=a positive integer) sequential energy level transitions each of which is approximately equal to the energy of a laser light photon, (2) the process includes M(M=a positive integer) sequential energy transitions each of which is approximately equal to the energy of a parametric light photon, and (3) the laser light transitions and the parametric light transitions share a common energy level. In FIG. 2, which illustrates the case for SH generation, for example, there are two nonlinear cascades, 2→3→4→2 and 3→4→5→3, each of which contributes energy to the SH light generated. More specifically, in each case N=2 (laser light transitions 2-3 and 3-4 in the first case; transitions 3-4 and 4-5 in the second) and M=1 (parametric light transition 4-2 in the first case; transition 5-3 in the second), and in each case the processes share a common energy level (level 2 in the first case; level 3 in the second).

Similar resonant configurations can be readily constructed for other parametric light generation processes. For example, if the nonlinear optical device were designed for 3-wave parametric interaction, the laser would be configured as a 2-wavelength internal pump source, and the two pairs of laser levels (one pair associated with each laser line) would be matched to corresponding pairs of energy levels of the parametric light.

On the other hand, in a nonresonant parametric process the NMR can again be located anywhere within the waveguide, but in this case, as is well known in the art, the process does not rely on quantized energy levels of QWs but on the intrinsic energy levels of bulk-like material. In general, however, devices that rely on a nonresonant process are not as efficient as those that utilize a resonant process, but the removal of the resonance condition makes them somewhat easier to design and fabricate.

Typically the substrate on which the various layers of the device 10 are formed serves as the lower cladding region 12. Alternatively, a lower cladding region, separate from the substrate, may be formed between the substrate and the core region. The upper cladding region 16 and the core region 14 are illustratively formed in the shape of a mesa or trapezoid typical of ridge waveguide laser structures. The mesa may be deep-etched as shown to penetrate into the substrate, or it may be shallow-etched (not shown) so that the mesa extends only through the upper cladding region 16. The sidewalls of the mesa may be essentially vertical (as shown in FIG. 1) or sloped (not shown) depending on the particular design and/or the fabrication technique utilized.

In either case, an electrically insulating layer 18 (e.g., $Si_3N_4$ or $SiO_2$) is formed over the top of the device and is patterned to form an opening that exposes a portion of the top of the ridge. Alternatively, the insulating layer may comprise a chalcogenide glass of the type described by J. N. Baillargeon et al. in U.S. Pat. No. 6,463,088 issued on Oct. 8, 2002, which is incorporated herein by reference. A first electrode 20 is formed over the insulating layer 18 and in the opening so as to contact the upper cladding region (usually by means of a highly doped contact-facilitating layer; e.g., the $n^{++}$InGaAs layer 21 shown in FIG. 3), and a second electrode 22 is formed on the bottom of the substrate. The first electrode 20 may be confined to the top of the mesa (as shown in FIG. 1), or it may extend along the sidewalls of the mesa (not shown).

The substrate itself may be a single crystal semiconductor body or a combination of such a body with another layer (e.g., an epitaxial layer grown on the top surface of the body). Illustratively, devices (e.g., lasers) of this type are fabricated from Group III-V compound semiconductors; e.g., In-based Group III-V compounds such as GaInAs and AlInAs for operation at mid-infrared wavelengths of about 4–24 $\mu$m. At shorter wavelengths, Group III-V compounds such as GaN and AlGaN may be used. Within any particular materials system the specific wavelength of the laser light is determined primarily by the thickness of the quantum wells that make up the RT regions.

Drive circuitry, not shown, is coupled across the electrodes in order to provide an external voltage bias and to supply pumping energy (e.g., electric current) to the device of sufficient magnitude to generate light. Below threshold the device operates as an incoherent, spontaneous emission source, whereas above threshold it operates as a coherent, stimulated emission source. In the latter case, when provided with optical feedback, the device functions as a laser. Suitable optical feedback is typically provided by an optical cavity resonator formed by a pair of reflectors; for example, by cleaved crystal facets, distributed feedback (DFB) gratings, distributed Bragg reflectors (DBRs), or a combination of them. In FIG. 1 one cleaved facet of the resonator might be the end face depicted, whereas the other, parallel facet would be at the opposite end (not shown) of the resonator.

True Phase Matching

In operation, light at the lasing (or laser) frequency undergoes a nonlinear (parametric) interaction with the NMR, which generates parametric light that is either up-converted (e.g., second harmonic, or sum frequency generation) or down-converted (e.g., difference frequency generation). However, the efficiency of the parametric processes is generally poor unless the laser light and the parametric light are phase matched.

Figure 5:
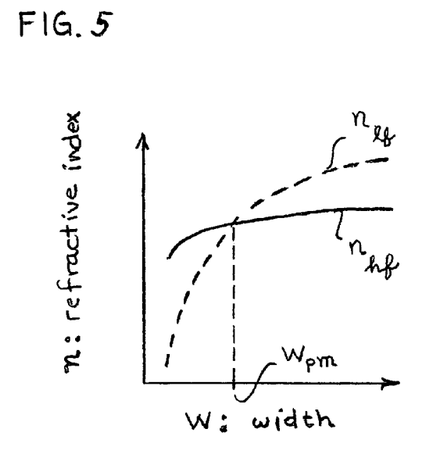
FIG. 5 is a schematic graph illustrating the effective refractive index versus ridge waveguide width in accordance with one aspect of our invention.

In order to achieve true phase matching in our ridge waveguide nonlinear optical devices, we design the waveguide (i.e., the thickness and doping of the various layers of the core region 14 and the cladding region 16, as well as the contact-facilitating layer 21) so that the effective-refractive-index-versus-ridge-width characteristics of the transverse modes of the laser light and the parametric light intersect one another at a phase matching width ($W_{pm}$), as shown in FIG. 5. Given the natural wavelength dispersion of materials, this condition means that at widths greater than the phase matching width, the effective refractive index of the mode of the higher frequency light ($n_{hf}$) is less than that of the lower frequency light ($n_{lf}$), but close to it at widths corresponding to an infinitely wide ridge. (In contrast, in bulk materials, $n_{hf} > n_{lf}$, and $n_{lf}$ falls off quicker than $n_{hf}$.) Preferably, the two effective refractive indices are within ~1% of one another under these circumstances. In order to attain true phase matching the device is designed so that the width of the ridge is made to be essentially equal to the phase matching width $W_{pm}$.

For clarity we note that in an up-conversion process, such as SH generation, the higher frequency light would be the SH light, and the lower frequency light would be the laser light. Conversely, in a down-conversion process, such as difference frequency generation, the higher frequency light would be the laser light, and the lower frequency light would be the difference frequency light.

Figure 6:
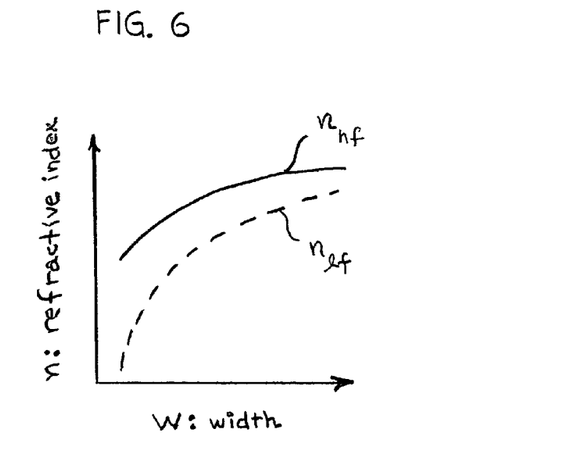
FIG. 6 is a schematic graph illustrating the effective refractive index versus ridge waveguide width in accordance with the prior art.

In contrast, we present FIG. 6 to illustrate the corresponding situation of a typical prior art ridge waveguide nonlinear optical device of the type, for example, described by Owschimikow et al., supra. Note that the curves for effective refractive indices of the laser and parametric light do not intersect in any region of practical waveguide widths, and consequently the device is not capable of operation under true phase matched conditions. Thus, the poor efficiency of this type of device is reflected in the relatively low power of the parametric light (e.g., 10–15 nW of SH light) in contrast with the much higher power parametric light (e.g., up to 240 µW of SH light) achieved in one embodiment of our invention described infra.

In order to achieve true phase matching, we take into account the transverse modes of the light and the optical losses that they experience. Considering first the issue of transverse modes, we note that in general ISB lasers emit lasing light in the zeroth-order transverse mode ($TM_{00}$). However, if the parametric light were also in the $TM_{00}$ mode, we found that it would be theoretically impossible to achieve phase matching due to material dispersion in the waveguide. Accordingly, we next considered parametric light in higher order transverse modes that satisfy the above mentioned condition that the effective refractive index of the higher frequency light is less than the effective refractive index of the lower frequency light for an infinitely-wide waveguide.

We note here that the ridge width is an important tuning parameter in our devices because at the relatively long wavelength of ISB laser operation (typically 4–24 µm) the optical field overlaps the sidewalls of the ridge; that is, although the strength of optical field decreases away from the center of the ridge waveguide, it still has a significant power level at the ridge sidewalls.

Figure 4:
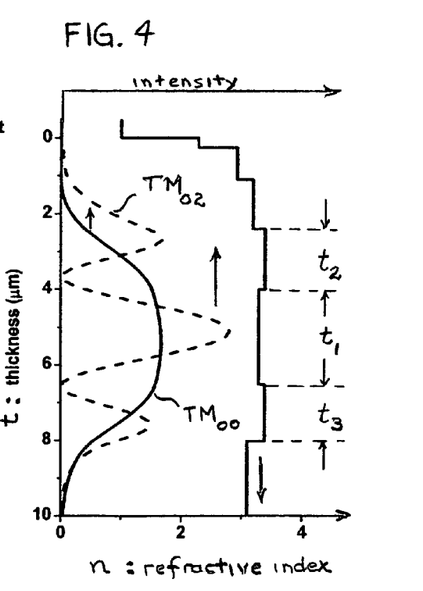
FIG. 4 shows schematically both the effective refractive index profile corresponding to the waveguide structure of FIG. 3 at the SH wavelength and the intensity of the magnetic field profiles (arbitrary units) for the $TM_{00}$ zeroth-order mode of the laser light (solid line) and $TM_{02}$ higher order mode of the SH light (dashed line)

In an illustrative embodiment of our invention, as shown in FIG. 3, the core region 14 of the nonlinear optical device comprises an active region 14.1 disposed adjacent at least one high index region 14.2, 14.3. In a preferred embodiment, the core region is located between an upper high index region 14.2 and a lower high index region 14.3. The upper and lower high index regions in turn separate the active region 14.1 from the upper and lower cladding regions, respectively. The refractive index of regions 14.2 and 14.3 is high in the sense that it is higher than that of the active region 14.1 and higher than that of the cladding regions, as shown in FIG. 4. The thicknesses, $t_2$ and $t_3$, and doping of these high index layers are adjusted in order to ensure that the refractive index profiles of the lasing light and the parametric light, as shown in FIG. 5, cross one another and are close enough to one another (i.e., within ~1%) for $W \to \infty$, so that W can be set essentially equal to $W_{pm}$ to attain true phase matching.

To further illustrate how these principles are applied, consider a nonlinear optical device that is designed for SH generation. We assume that the laser light (the low frequency light) is in the $TM_{00}$ mode and that the SH light (the high frequency light) is in a $TM_{0m}$ mode (m=1, 2, 3 . . . ). We first calculate $n_f$ for the laser light and $n_{sh}$ for the SH light for a particular value of m; that is, for a particular higher order transverse mode by solving Helmholtz' equations. We then compare $n_{sh}$ and $n_f$ as $W \to \infty$ to determine if $n_{sh}$ is less than $n_f$ and if they are within ~1% of one another. If not, then the thicknesses $t_2$ and $t_3$ of the high index layers are adjusted, and $n_{sh}$ and $n_f$ are recalculated. If no set of thicknesses produces the desired result, then a higher value of m is selected and the above process is repeated. Once we find a value of m that brings $n_{sh}$ and $n_f$ to within ~1% of one another, then W is selected to be essentially equal to $W_{pm}$.

This process is designed to produce phase matching using the lowest order transverse modes because such lower order modes experience lower optical loss than higher order modes. Additionally, the thickness and doping of the upper cladding layer 16 and the highly-doped contact layer 21 are adjusted to minimize the losses experienced by the laser and parametric light.

Instead of the up-conversion process demonstrated by SH generation, let us consider a down-conversion process. In this case, we design our nonlinear optical device so that the low frequency down-converted light is in the $TM_{00}$ mode. Since dispersion considerations mitigate against the laser light also being in a $TM_{00}$ mode, it must be designed to operate in a higher order mode (contrary to the operation of conventional ISB laser designs) without experiencing undue optical loss. If we want the laser light to be in a particular higher order transverse mode and yet not experience significant loss, then we adjust the design of the core region so that it has a symmetry or an asymmetry in its refractive index profile that corresponds to the symmetry or asymmetry, respectively, of the intensity profile of the particular transverse mode. For example, suppose we want the laser to generate light in the $TM_{01}$ mode, which has a double-peaked intensity profile. Then, we would choose the thicknesses $t_2$ and $t_3$ of the high index layers 14.2 and 14.3, respectively, to be sufficiently unequal to maximize the overlap of the double-peaked $TM_{01}$ mode with the active region. (Note, the refractive-index profile need not be double-peaked, it can just be suitably asymmetrical.). In an extreme case, either $t_2$ or $t_3$, but not both, could be made equal to zero. In addition, it is also important to maximize the overlap of the zeroth-order transverse mode of the down-converted light with the active region.

EXAMPLE

This example describes phase matched second harmonic generation at a center wavelength of 4.55 µm in a monolithically integrated, ridge waveguide, nonlinear optical QC device fabricated from InP/InGaAs/AlInAs compound semiconductor materials. Various materials, dimensions and operating conditions are provided by way of illustration only and, unless otherwise expressly stated, are not intended to limit the scope of the invention.

The QC device structures used in this study were grown by molecular beam epitaxy (MBE) on InP substrates. All samples employed the fairly well optimized active region (described by Gmachl et al., supra), which was the source of internal pump (laser) light and second harmonic light. As shown in FIG. 2, each of fifty stages 17 of the active region 14.1 included an RT region 14.1a and an I/R region 14.b. The laser transition (black arrow 14.4) occurred between energy levels 3 and 2 of the RT region. The resonant intersubband nonlinear cascades were 2→3→4→2 and 3→4→5→3. The shaded rectangles schematically indicate the extent of the minibands inside the I/R regions. The layer thicknesses of one period (stage 17) of the RT-I/R region sequence were from left to right starting at injection barrier "I": 4.1/8.3/1.3/5.2/2.6/4.1/2.1/3.9/2.3/3.7/2.5/3.5/2.6/3.3 nm. In this sequence, the AlInAs quantum well layers are indicated by normal (non-bold face) font, whereas the InGaAs barrier layers are indicated by bold font. The underlined layers were doped n-type to $3.0 \times 10^{17}$ cm$^{-3}$, whereas the non-underlined layers were unintentionally doped; that is, any doping of these layers was nominal and caused by contamination in the chamber used to grow the layers.

The structure of the ridge waveguide, shown schematically in FIG. 3, indicates that the core region 14 included a 2475 nm-thick active region 14.1 bounded by upper and lower higher refractive index InGaAs layers 14.2 and 14.3, respectively, which were both doped n-type to $1 \times 10^{17}$ cm$^{-3}$ and were 1600 nm and 1500 nm thick, respectively.

Upper cladding region 16 was formed on the upper high refractive index layer 14.2, whereas lower cladding region 12 was formed by an n-InP substrate doped n-type to 1–5×10$^{17}$ cm$^{-3}$. The upper cladding region 16, in turn, comprised lower refractive index InAlAs layers 16.1 and 16.2, which were doped n-type to 1×10$^{17}$ cm$^{-3}$ and 6.5×10$^{18}$ cm$^{-3}$ and were 1300 nm and 850 nm thick, respectively. A highly doped (1×10$^{20}$ cm$^{-3}$), thin (10 nm), n-type InGaAs contact-facilitating layer 21 was formed on top of layer 16.2. A patterned Si$_3$N$_4$ insulating layer 18 (FIG. 1) was formed over the top surface of the device. A Ti/Au contact 20 was formed in the contact window of layer 18 and on the top of layer 21, and a Ge/Au/Ag/Au contact 22 was formed on the bottom of substrate 12.

Throughout the structure all intentionally doped MBE layers were doped with Si.

The devices were processed into 4-to-16-μm-wide, 1.5–2.25-mm-long, deep-etched ridge-waveguide, laser structures. The cavity resonator of each device was formed by a pair of parallel, cleaved crystal facets at opposite ends of the waveguide. The samples were mounted on the temperature controlled cold-finger of a He cryostat. All measurements discussed herein were taken at cryogenic temperatures (~10 K). The devices, which were operated in pulsed mode, were driven by current pulses having 50–100 ns durations at repetition rates of 4 and 84.2 kHz. The spectra were taken using a Fourier Transform Infrared Spectrometer fitted with cooled HgCdTe and InSb detectors for the zeroth-order mode laser (internal pump) light and higher order mode SH light, respectively. The laser light emitted by these devices had a center wavelength around 9.1 μm. This light interacted with the NMR in the core region to generate the SH (parametric) light, which we measured to have a center wavelength around 4.55 μm. The light-output-versus-current (L-I) measurements were taken with a calibrated fast HgCdTe photovoltaic detector for the laser light and with a calibrated, cooled InSb detector for the SH light.

The optimization of the QC laser active region is described in Gmachl et al., supra. In addition to the regular laser levels denoted 3 and 2 in FIG. 2, the band structure of the QC device exhibited two resonant nonlinear cascades, 2→3→4→2 and 3→4→5→3. The power in the SH light P$_{NL}$ has a quadratic dependence on the power in the laser light P$_L$, which is also described in Gmachl et al., supra:

$$P_{NL} \sim \frac{128\pi^5 \Sigma [1 + e^{-2\alpha_2 L} - 2e^{-\alpha_2 L}\cos(\Delta k L)](1-R_2)P_L^2}{\mu_1^2 \mu_2 c \lambda_2^2 (\Delta k^2 + \alpha_2^2)(1-R_1)^2} \quad (1)$$

where α$_2$ stands for the total losses of a given cavity mode at the SH wavelength λ$_2$=λ$_1$/λ2, L is the cavity length, R$_{1,2}$ and μ$_{1,2}$ are the reflection factors of the cavity mirrors (cleaved facets) and effective refractive indices of the modes at wavelengths λ$_{1,2}$, respectively. Δk=k$_{2\omega}$−2k$_\omega$= 2ω(μ$_2$−μ$_1$)/c is the phase mismatch. Σ, which depends strongly on the structure of the active region and the waveguide, can be written as Σ=|χ$^{(2)}$|$^2$/A$_{eff}$, where A$_{eff}$ is the effective interaction area defined by the overlap integral of the transverse mode intensity profiles with the nonlinear region, as described in Gmachl et al., supra. For the active region and waveguide studied herein the maximum nonlinear susceptibility |χ$^{(2)}$| ~4×10$^{-5}$ esu (2×10$^4$ pm/V), assuming exact resonance for all interacting fields, while A$_{eff}$ varied between 600 and 1400 μm$^2$ as the ridge width varied between 6 and 12 μm. In these experiments we focused on maximizing the power transfer from the laser light to the nonlinear (parametric) SH light by minimizing the phase mismatch Δk and effective area A$_{eff}$. The maximum nonlinear power P$_{NL}$ and the nonlinear power conversion efficiency η=P$_{NL}$/P$_L^2$, measured as the slope of the P$_{NL}$ vs. P$_L^2$ curve, were employed as figures of merit for the waveguide design.

For QC lasers, the phase mismatch, Δk, is determined by the structure of the laser waveguide. Due to material dispersion at the λ$_{1,2}$ phase-matching was not possible between the zeroth-order transverse modes (TM$_{00}$) of the laser light and SH light, nor between the zeroth-order transverse mode (TM$_{00}$) of the laser light and the first-order transverse mode (TM$_{01}$) of the SH light. However, numerical analysis showed that phase matching is possible between the zeroth-order mode (TM$_{00}$) of the laser light and the second-order mode (TM$_{02}$) of the SH light. The lowest order SH transverse mode offers the advantage of lowest loss. The second important consideration is to maximize the overlap integral of these modes with the NMR. Modes of different transverse order and the same frequency are exactly orthogonal. Since the frequencies differ by a factor of 2 in this example, this orthogonality is partially lifted (i.e., the overlap integral is not zero), but still the overlap integral between these modes over the transverse (vertical) cross-section of the waveguide is quite small. However, in our devices the nonlinear mixing occurs only in the active region, which we position in the vertical cross-section of the waveguide (FIG. 3) so that the overlap integral is maximized (FIG. 4).

The refractive indices of undoped InGaAs and InAlAs layers were derived by linear interpolation between the published values of the end alloys at 9.1 μm and 4.55 μm. The complex refractive indices of the variously doped layers were then calculated using the well-known Drude formalism. The refractive index profile has the shape plotted in FIG. 4. This profile is similar to the "M-waveguides" that have been proposed for second-harmonic phase-matching in LiNbO$_3$ and AlGaAs in the near-infrared, as described by Chowdhury et al. and Moutzouris et al., respectively, supra.

Figure 7:
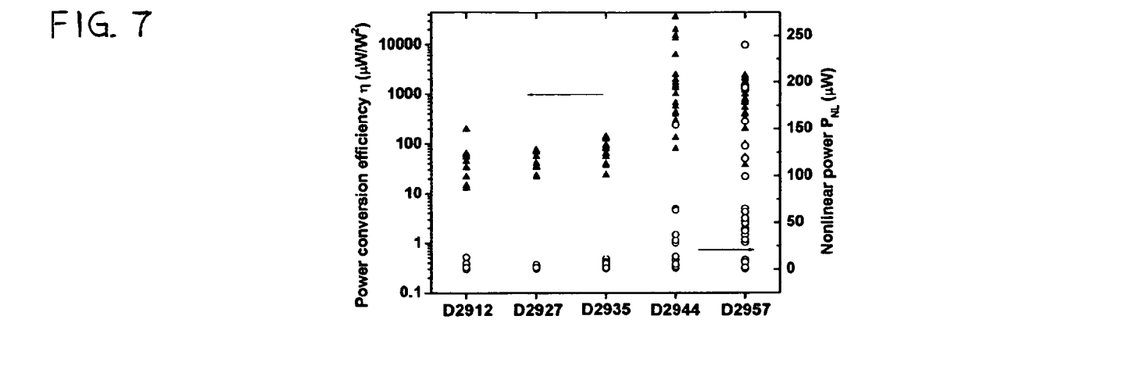
FIG. 7 is a scatter plot summarizing the maximum SH power (circles) and nonlinear power conversion efficiency (triangles) for five generations of ridge waveguide design. Each sample is labeled with its wafer number (i.e., D2912, D2927, D2935, D2944, and D2957)
Figure 9:
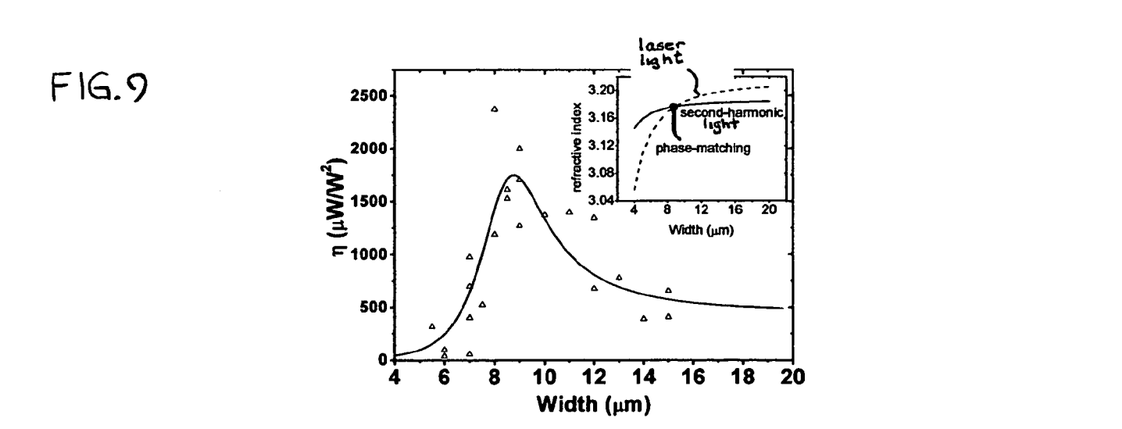
FIG. 9 is a graph showing the ridge-width dependence of the nonlinear power conversion efficiency for wafer D2957 in accordance with one embodiment of our invention. The continuous line through the data points represents a fit with a Lorentzian-like function. The inset shows the theoretical dependence of the effective refractive indices on the ridge width for both the zeroth-order mode laser light and the higher order mode SH light.

Starting from the layer sequence of a standard low-loss QC laser waveguide, the layer thicknesses were first optimized to minimize the phase-mismatch corresponding to an infinitely wide waveguide. The difficulty of designing a phase-matched waveguide lies in the uncertainty of the refractive indices for the various materials and in the inevitable deviation from the design introduced by the MBE process. To keep the phase mismatch Δk below 100 cm$^{-1}$, one skilled in the art would need to know and control the refractive indices of the waveguide layers with accuracy better than 0.1%, which is very difficult to do. Therefore, we needed a degree of freedom in the design that would allow us to tune through the phase-matching point. We discovered that such a degree of freedom is provided by the dependence of the effective refractive index on the ridge waveguide width (W). The effective refractive index of the zeroth-order mode laser light decreases faster with decreasing ridge width than that of the higher-order mode SH light (FIG. 5 and the inset of FIG. 9). This behavior is due to two factors: (1) a slightly larger overlap of the zeroth-order mode with the Si$_3$N$_4$ insulator 18 and metal contact layers 20 outside the semiconductor ridge, and (2) the different refractive indices at the two wavelengths. The crossover point, corresponding to exact phase-matching, was designed to lie within the available experimental ridge-width range of about 4 to 16 μm FIG. 7 summarizes the experimental results for five generations of device design. Each column displays the nonlinear conversion efficiency and maximum nonlinear power corresponding to all the devices of different ridge-widths processed out of each wafer. The results represent an increase of more than two orders of magnitude compared to Gmachl et al., supra, for both the maximum nonlinear power and the nonlinear power conversion efficiency.

Figure 8:
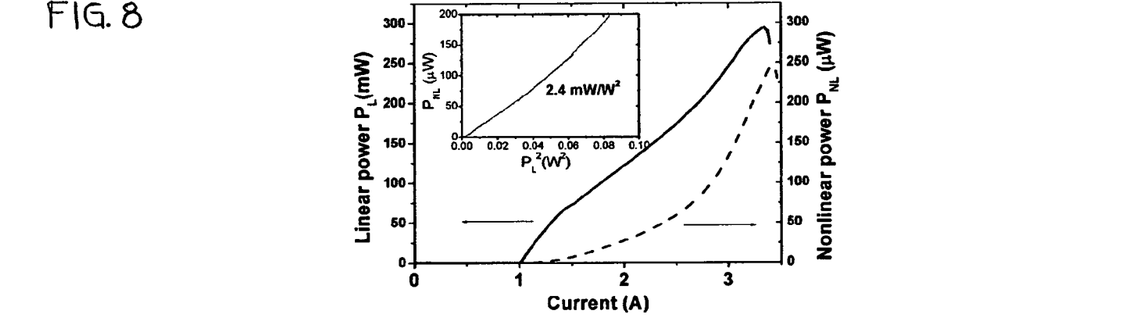
FIG. 8 is a graph of light-output-power-versus-current for the zeroth-order mode of the laser light (solid line) and higher order mode of the SH light (dashed line). The nonlinear optical devices were 8-$\mu$m-wide, 1.5-mm-long with the ridge waveguide structure shown in FIG. 3 (sample D2957) in accordance with one embodiment of our invention. The inset shows the SH power as a function of the linear power squared and a fit of the curve with a straight line in the central portion of this curve.

The waveguide structure detailed in FIG. 3 (sample D2957) provides an optimal calculated phase-mismatch of 367 cm$^{-1}$ for an infinitely wide waveguide, a value that is theoretically reduced to zero for an 8.8-μm-wide ridge device (i.e., $W_{pm}$~8.8 μm). FIG. 8 shows the L-I curves at the laser and SH wavelengths for an 8-μm-wide, 1.5-mm-long device with this waveguide structure. Even though the ridge width of this device deviated from $W_{pm}$ by about 10%, it displayed a record maximum nonlinear power of 240 μW and a nonlinear efficiency of approximately 2.4 mW/W$^2$.

On the other hand, in a different device (sample D2944) having a narrow ridge, the highest nonlinear conversion efficiency of 36 mW/W$^2$ was achieved for a ridge width of 4 μm, which was at the lowest end of what was feasible in this processing run. The maximum theoretical nonlinear efficiency is 2 W/W$^2$, assuming $\Delta k=\alpha_2=10$ cm$^{-1}$ and undepleted pumping. With this efficiency, pump depletion was reached when the laser light power went beyond about 200 mW. The factor of about 60 between the theoretical prediction and the experimental results can be explained by a 0.5 to 1-μm-ridge-width non-uniformity intrinsic to our wet-chemical mesa etching process. Deviation by 0.5 μm from the optimal ridge width would cause the mismatch to increase to $\Delta k$~50 cm$^{-1}$. Another possible factor contributing to lower efficiency is excitation of higher-order lateral laser light modes that have much lower conversion efficiency. (By lateral modes we mean transverse modes in the plane of the layers.) Excitation of higher-order laser modes is probably also the reason the transverse SH far-field pattern exhibited a single broad peak instead of the 3-lobe shape expected for the (TM$_{02}$) mode.

The ridge-width dependence of the nonlinear power efficiency was studied in detail for sample D2957 (FIG. 9). The ridge width was measured on the active region with a precision of ±0.5 μm. (This variation in width occurred along the length of the waveguide.) As expected from the theoretical calculations, the nonlinear conversion efficiency displayed a maximum for ridge widths around $W_{pm}$=8–9 μm. The maximum nonlinear efficiency value for this sample was about a factor of 10 lower than the maximum measured for sample D2944, possibly due to a slightly shorter laser wavelength indicating non-optimum (less-resonant) energy level conditions. The continuous line through the data points represents a fit of the data with a Lorentzian-like function of the form $1/(\Delta k^2+\alpha_2^2)$, where $\Delta k^2$ is the calculated phase-mismatch. The width of the experimental curve (closely related to the optical loss $\alpha_2$) was considerably larger than expected theoretically, most likely due to a larger experimental loss, as well as to other ridge-width-dependent factors mentioned above.

In summary, this example demonstrates that we have developed a technique for true phase-matching in QC lasers with integrated nonlinearity for SH generation. This technique takes advantage of the flexibility in the design of a QC laser waveguide structure to achieve near phase-matching conditions and large nonlinear overlap for modes of different transverse order. An additional variable for tuning the phase-matching is provided by the stronger dependence of the effective refractive index of the laser light mode on the ridge width relative to the SH modal refractive index. An improvement of two orders of magnitude in the maximum nonlinear power and nonlinear power conversion efficiency was achieved by essentially optimizing the waveguide layer structure and geometry. The agreement with calculations on the position of the optimal ridge width indicates an accurate choice of refractive indices. In addition, the agreement will help us to design further phase-matched waveguides for other nonlinear effects in QC lasers. Given the sensitivity of the phase-matching condition on the device dimensions, we believe that additional increase of the nonlinear efficiency can be achieved by improving the device fabrication process, in particular the mesa definition by the use of dry etching.

It is to be understood that the above-described arrangements are merely illustrative of the many possible specific embodiments that can be devised to represent application of the principles of the invention. Numerous and varied other arrangements can be devised in accordance with these principles by those skilled in the art without departing from the spirit and scope of the invention.

We claim:

1. An intersubband (ISB) nonlinear optical device comprising:
    a cavity resonator including a ridge waveguide,
    said waveguide including a nonlinear mixing region and a core region, said mixing region and said core region being monolithically integrated within said waveguide,
    said core region including an active region comprising a multiplicity of repeat units, each repeat unit including a unipolar radiative transition (RT) region and a relaxation/injection (I/R) region adjacent thereto,
    said RT regions generating lasing light at at least one first center frequency via intersubband optical transitions in response to pumping energy applied thereto, and
    said nonlinear mixing region generating parametric light at at least one second center frequency, different from said first center frequency, in response to said lasing light, characterized in that
    said waveguide is configured so that (i) said lasing light is generated in a first transverse mode and said parametric light is generated in a second, different transverse mode, and (ii) the effective-refractive-index-versus-ridge-width characteristics of said first and second modes intersect one another at a phase matching width, and
    said ridge width is essentially equal to said phase matching width.

2. The device of claim 1, wherein said core region includes at least one higher refractive index region adjacent thereto.

3. The device of claim 2, wherein said core region includes said higher refractive index regions on opposite sides of said active region, the thicknesses of said higher refractive index regions enhancing the overlap between the intensity profiles of the transverse modes of said lasing light and said parametric light with said nonlinear mixing region.

4. The device of claim 1, wherein said parametric light second frequency is higher than said lasing light first frequency, said lasing light is generated in a zeroth-order transverse mode, and said parametric light is generated in a higher order transverse mode.

5. The device of claim 4, wherein said parametric light is generated in a second-order transverse mode.

6. The device of claim 5, wherein said parametric light is generated as a second harmonic of said lasing light.

7. The device of claim 1, wherein said parametric light second frequency is lower than said lasing light first frequency, said parametric light is generated in a zeroth-order transverse mode, and said lasing light is generated in a higher order transverse mode.

8. The device of claim 7, wherein said core region includes higher refractive index regions on opposite sides of said active region, the thicknesses of said higher refractive index regions enhancing the overlap between the intensity profiles of the transverse modes of said lasing light and said parametric light with said nonlinear mixing region.

9. The device of claim 1, wherein said waveguide is also configured so that, at ridge widths greater than said phase matching width, the effective refractive index of said mode having a lower frequency is greater than that of said mode having a higher frequency.

10. The device of claim 1, wherein said core region includes said nonlinear mixing region.

11. The device of claim 10, wherein said active region includes said nonlinear mixing region.

12. The device of claim 1, wherein said nonlinear mixing region and said active region are configured so that said lasing light and said parametric light are resonant with ISB transitions in said nonlinear mixing region.

13. The device of claim 1, wherein said nonlinear mixing region and said active region are configured so that said lasing light and said parametric light are nonresonant with ISB transitions in said nonlinear mixing region.

14. The device of claim 1, wherein said active regions are configured to generate lasing light at at least two center frequencies, and said nonlinear mixing region is configured to respond to said at least two lasing frequencies to generate said parametric light.

15. The device of claim 1, wherein said active regions are configured to generate lasing light at a single center frequency, and said nonlinear mixing region is configured to respond to said single lasing frequency to generate said parametric light.

16. A monolithically integrated, quantum cascade (QC) nonlinear optical device comprising:
   a cavity resonator including a ridge waveguide,
   said waveguide including a nonlinear mixing region and a core region,
   said core region including an active region and higher refractive index regions on opposite sides of said active region,
   said active region including a multiplicity of repeat units disposed within said waveguide, each repeat unit including a unipolar radiative transition (RT) region and a relaxation/injection (I/R) region adjacent thereto,
   said nonlinear mixing region being located within said active region,
   said RT regions generating lasing light at at least one first center frequency via intersubband optical transitions in response to pumping current applied thereto, and
   said nonlinear mixing region generating parametric light at at least one second center frequency, different from said first center frequency, in response to said lasing light, said parametric light and said lasing light being resonant with intersubband transitions in said RT regions, characterized in that
   said waveguide is configured so that (i) said lasing light is generated in a first transverse mode and said parametric light is generated in a second, different transverse mode, (ii) the effective-refractive-index-versus-ridge-width characteristics of said first and second modes intersect one another at a phase matching width, and (iii) at ridge widths greater than said phase matching width, the effective refractive index of said mode having a lower frequency is greater than that of said mode having a higher frequency, and
   said ridge width is essentially equal to said phase matching width.

* * * * *